(12) United States Patent
Bryniarski et al.

(10) Patent No.: US 6,195,462 B1
(45) Date of Patent: Feb. 27, 2001

(54) IMAGE COMPRESSION

(75) Inventors: Gregory R. Bryniarski; Brian R. Wilson, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/050,683

(22) Filed: Mar. 30, 1998

(51) Int. Cl.[7] ................................ G06K 9/36; H04N 1/04
(52) U.S. Cl. .................... 382/239; 382/232; 382/299; 358/487; 345/43
(58) Field of Search .................... 382/232, 239, 382/299; 345/433; 358/487

(56) References Cited

U.S. PATENT DOCUMENTS

| | | |
|---|---|---|
| 5,012,346 | 4/1991 | DeJager et al. . |
| 5,027,287 | * 6/1991 | Artigalas et al. .................... 345/433 |
| 5,136,371 | 8/1992 | Savatier et al. . |
| 5,157,488 | 10/1992 | Penebaker . |
| 5,168,374 | 12/1992 | Morimoto . |
| 5,321,522 | 6/1994 | Eschbach . |
| 5,459,585 | 10/1995 | Owashi et al. . |
| 5,467,110 | 11/1995 | White et al. . |
| 5,513,375 | 4/1996 | Peters . |
| 5,581,481 | 12/1996 | Weerackody et al. . |
| 5,617,142 | 4/1997 | Hamilton . |
| 5,666,215 | * 9/1997 | Fredlund et al. ..................... 358/487 |
| 5,917,952 | * 6/1999 | Noh ....................................... 382/239 |

* cited by examiner

Primary Examiner—Leo H. Boudreau
Assistant Examiner—Gregory Desire
(74) Attorney, Agent, or Firm—Gordon M. Stewart; David A. Novais

(57) ABSTRACT

An image compression method in which the size of a compressed low resolution version of an image is used to either estimate a compression factor for the image needed to obtain an aim compressed image size, or to estimate the size of the compressed image resulting from a predetermined compression factor. The estimate can be made with the aid of a predetermined relationship between compressed image size, image resolution and compression factor, which relationship may be a linear or linear inverse one. This relationship is preferably obtained from images of the same class as the one to be compressed. The image is then compressed using the estimated or predetermined compression factor. An apparatus using such a method is also provided.

5 Claims, 8 Drawing Sheets

IMAGE COMPRESSION

FIELD OF THE INVENTION

This invention relates to a method and apparatus for compressing images.

BACKGROUND OF THE INVENTION

Recently services are being offered where a customer requests a photofinisher to process a roll of film (that is, chemically develop a roll of film carrying one or more latent optical images to yield corresponding fixed developed optical images) and also provide digitized versions of the photographic images on a storage medium, such as a floppy disk. Because photographic images require large amounts of digital data, and the floppy disk has very limited storage capacity, the digital photographic image files are typically compressed using standard compression methods.

For image compression systems, a fundamental distinction can be made between lossy and lossless compression systems. A lossless compression system will compress and decompress image data in such a way that decompressed image data is exactly the same as the originally input image data. In comparison, the decompressed image data resulting from a lossy compression system will be different from the originally input image data. The human visual system has a minimum detectable threshold that allows us to perceive as the same, an original and its decompressed image that have some small amount of real difference between them. By taking advantage of this human visual system threshold, a lossy compression system can provide a higher compression rate without visible degradation in an image.

Another fundamental distinction between image compression systems can be made between variable-rate systems (sometimes referenced herein as simply a "variable compression" system or function) and fixed-rate systems. Rate refers to the number of bits required after compression to represent a given spatial unit (for example, bits/pixel, bits/image, bits/image collection, and the like). A variable-rate compression system is one that produces a variable output data rate, depending on the properties of the input image data. Conversely, a fixed-rate compression system is one that produces a constant output data rate, regardless of the input image data.

The fundamental trade-off in lossy compression systems is between compressed data rate and image quality. For a constant level of image quality, a higher rate is generally needed for an image or image region containing significant detail (that is, signal energy), as compared to a relatively low detail image or image region. A variable-rate system is well-suited to providing a constant level of image quality, since bits are expended as needed to match the image or image region characteristics. In comparison, a fixed-rate system must compromise on image quality for those images or image regions where the available number of bits is insufficient.

When photographic images are compressed using a variable rate lossy compression method, such as JPEG, it is difficult to predict what the final compressed file storage space will be because the actual image content of an individual image will impact the final file storage space of that image. It is easy to predict the size of a compressed file when a fixed compression method is employed.

An example of a well-known variable-rate lossy compression method is the JPEG (Joint Photographic Experts Group) international standard, as described by W. B. Pennebaker and J. L. Mitchell, "JPEG: Still Image Data Compression Standard," Van Nostrand Reinhold, New York 1993. This reference and all other references cited herein are incorporated by reference. The JPEG system parameter that exerts the largest effect on the compressed data rate is the quantization table specification. There are many possible methods to adjust the JPEG quantization table in order to achieve a predictable file storage space for the image collection. The most straightforward method is to start with an initial quantization table, compress an image or collection of images, and then adjust the initial table by a multiplicative scaling factor if the desired rate is not achieved. A scaling factor greater than one results in more quantization and hence a lower rate than achieved with the initial quantization table. Likewise, a scaling factor less than one results in less quantization and hence a higher rate than that achieved with the initial quantization table. If the desired rate is not achieved after the first adjustment, this adjustment process can be iterated (that is, repeated) until the rate constraint is met. To make such an approach useful in practice, it is necessary to achieve the desired rate in only a few iterations, since compression of the images with any one scaling factor is relatively computationally intensive.

When the same JPEG parameters are used to compress two different images, each image results in a different final compressed file storage space due to the contents of the different images. This makes it impossible to predict how much file storage space is required to store a collection of images until the images have actually been compressed.

When trying to guarantee that a collection of compressed images will fit on a limited storage medium such as a floppy disk, a fixed set of JPEG compression parameters could be chosen to insure that all images can be compressed to fit on the disk even if all of the images were highly detailed. Such a set of fixed compression parameters, because they are selected to accommodate the worst case scenario of all images containing high amounts of detail, will overcompress most images. Unfortunately, the more a photographic image is compressed, the more image quality that is lost.

In addition, when a consumer has a photographic film processed and the images thereon scanned, with some images the degree of compression required even to barely fit the images on a limited storage medium, such as a diskette, will produce compressed images with unacceptable loss in image quality.

It is therefore desirable to have a compression method that, for example, can do any one or more of the following. Namely, it would be desirable to have a compression method that estimates the minimum compression necessary for a collection of one or more images so that the actual compressed collection will fit within a limited storage space, such as that provided by a floppy disk, without being over-compressed, so that almost all the available storage space is used. It would further be desirable if such a method is not computationally intensive for a typical image set. It would also be desirable if for a given collection of images, that the compression method recognizes that the compression required to fit the collection on such a fixed capacity medium produces unacceptable losses and compensates for this situation.

SUMMARY OF THE INVENTION

One feature, for example, of the present invention, is that it recognizes that a good guide for estimating a resulting size of a compressed image (or a set of images) from a variable compression function, can be obtained by compressing a reduced resolution version of the image (such as a "thumbnail" of the image) at a selected compression factor, and determining the size of the compressed reduced resolution version. Another feature recognizes that between images (or sets of images), the relative relationship between compressed image size, image resolution and compression factor, is of a relatively low variability. Thus, a predetermined relationship of these variables can be used along with the result from compressing the reduced resolution version of the image (or set of images), to obtain a particularly good guide for estimating a resulting size of a compressed image from a variable compression function.

The present invention provides in one aspect, an image compression method comprising using the size of a compressed reduced resolution version of the image and corresponding compression factor, to estimate a compression factor for the image needed to obtain an aim compressed image size, or to estimate the size of the compressed image resulting from a predetermined compression factor.

The estimated compression factor or size, is then typically used to actually compress the image. However, this information could be used for other purposes. For example, in some situations it may be decided that if an image when compressed with a maximum predetermined compression factor (to preserve image quality) would have a compressed image size beyond a predetermined limit, it may be decided simply not to compress that image.

In another aspect of the method of the present invention, the reduced resolution version of the image is actually obtained and compressed (rather than the data relating to the size of the reduced resolution version, and a compression factor and corresponding compressed size, being obtained elsewhere).

In cases where an aim compressed image size is desired (such as for storing images on a storage medium with limited available space), then the compression factor is estimated and this estimated compression factor used typically in the same variable compression function used for compressing the reduced resolution version. In cases where it is only desired to determine the size of a compressed image using a predetermined compression factor (such as in an image transmission system where the compression factor is to remain the same over time, but variations in required bandwidth needs to be known), the image may be compressed just using the predetermined compression factor typically in the same variable compression function as used for compressing the reduced resolution version.

In particular, in the present invention the compression factor or size of the compressed image may be determined using the size of the compressed reduced resolution version, and a predetermined relationship between compressed image size, image resolution, and compression factor. The referenced relationship need only be a relative one between the three variables such that an absolute value of any point in the relationship can be established after one point is known. In one aspect of the invention, the predetermined relationship between any two of the variables is a linear or linear inverse relationship, that is the slope of the line plotting two of the variables (or one variable and the inverse of the other, in the case of a linear inverse relationship), is predetermined to be constant for any given image (or set of images). In one aspect, the pre-determined relationship may comprise a pre-determined first sub-relationship between image resolution and compressed image size at a given compression factor, and a pre-determined second sub-relationship between compression factor and compressed image size for an image of a given resolution. The first sub-relationship is preferably linear, while the second is preferably linear inverse, each being a line with a known slope.

In another aspect of the present invention, particularly where an aim compressed image size is to be obtained, the accuracy of the estimated compression factor to obtain the aim compressed image size, can be evaluated and one or more iterations performed to improve accuracy. In this method, the compression factor is first estimated as described above, and the image is then compressed using the estimated compression factor. Additionally, this method comprises:

(e) comparing the actual size of the compressed image with the aim compressed image size based on the estimated compression factor; and (f) when the actual compressed image size is not within a predetermined tolerance of the aim compressed image size, estimating a corrected compression factor using either:

(i) the actual compressed image size and the predetermined relationship; or (ii) a new relationship determined from the actual compressed image size and corresponding compression factor, and another compressed image size and corresponding compression factor.

If a new relationship is used (such as determining a new slope of a line representing a graph of compression factor and the inverse of compressed image size), another compressed image size and corresponding compression factor could be estimated (for example, using the results from the reduced resolution version compression) or actual (for example, from a previous iteration). Further iterations can be actually obtained by:

(g) compressing the image using the corrected estimated compression factor; and (h) repeating steps (e) to (g), as necessary, using the corrected compression factor as the estimated correction factor, until the actual compressed image size is within a predetermined tolerance of the aim compressed image size.

In another aspect of the present invention, a method of the invention used for an image, can be used to handle a set of a plurality of images. In this method, all the images of the set are handled together in the same manner as one image, as described above. Thus, in one aspect of the invention the total size of compressed reduced resolution versions of a set of images, and a corresponding single compression factor used for all the reduced resolution versions of the set, is used to estimate a compression factor to be applied to all the images of the set to obtain an aim compressed set size, or to estimate the size of the compressed set resulting from a predetermined compression factor (which is applied to all the images of the set. In a particular application of this aspect, the method comprises:

a) obtaining a reduced resolution version of each image of the set;

b) compressing the reduced resolution versions of the images at a selected compression factor;

c) using the total size of the compressed reduced resolution versions and corresponding compression factor, to estimate a compression factor for the set needed to obtain a predetermined compressed set size, or to estimate the size of the compressed set resulting from a predetermined compression factor;

d) compressing the set using the compression function. Other aspects of this method are analogous to those already described above in connection with a single image, with the set of images being handled essentially like one image in that the sizes for the images, their low resolution versions, or their compressed versions (reduced or full resolution) being added together for the purpose of calculations.

The present invention further provides an image processor which can execute any aspects of the method of the present invention. In one aspect, such an image processor has an estimator to receive the size of a compressed reduced resolution version of the image and corresponding compression factor, and do the necessary estimating from the size of the compressed resolution version and corresponding compression factor. In another aspect, the image processor additionally comprises a second compressor to compress the image using the estimated or predetermined compression factor. In a further aspect, the image processor comprises an input to receive a reduced resolution version of each image of the set, a first compressor to compress the reduced resolution version of the images, an estimator to do the necessary estimating, and a second compressor to compress the set. The second compressor may be the same or different from the first compressor (for example, both may be the same suitably programmed microprocessor).

The present invention also provides, in another aspect, a photofinishing process which comprises developing a photographic film carrying a set of latent optical images (which set may be all of, or less than, all the images carried by the film), and scanning at least one of the developed images of the set (and preferably all the images of the set). At least one, and preferably all, the images are then compressed using a method of the present invention. Optionally, the resulting compressed images are written by an image writer onto a storage medium. A photofinishing apparatus is also provided in the present invention, which includes a developer, a scanner, an image processor of the present invention, and optionally the image writer.

A still further aspect of the present invention provides a computer program product comprising: a computer readable storage medium having a computer program stored thereon which when read and executed by a programmable computer, performs the steps of any method of the present invention.

The present invention then, can provide a reasonably close estimate for the estimated compression factor needed to obtain an aim compressed image size, or the estimated compressed image size resulting from using a predetermined compression factor. Thus, for example, the method can therefore provide a good estimate of the minimum compression necessary for a collection of one or more images so that the actual compressed collection will fit within a limited storage space, such as that provided by a floppy disk, without being over-compressed, so that almost all the available storage space is used. Methods of the present invention are not computationally intensive for a typical image or image set. Furthermore, a method of the present invention can recognize when the compression required to fit a set of images within a given amount of space produces unacceptable losses, and compensate for this situation.

BRIEF DESCRIPTION OF THE DRAWINGS

Embodiments of the invention will now be described with reference to the drawings in which.

DETAILED DESCRIPTION OF THE INVENTION

The compression factor referenced herein, is any factor in a variable compression function, which affects the compression rate. In a JPEG system, this includes any factor affecting the quantization table, such as the table values themselves or a scale factor. In the examples below, only the quantization table scale factor is altered. The same compression function is normally used when compressing both the reduced resolution and full resolution versions of the image. When an "image" is used in the present application in relation to an electronic image signal, without an attached reference to "reduced resolution" or similar terms relating to resolution, then it will be understood that this refers to the full resolution version of the image signal unless a contrary intention appears.

Figure 1:
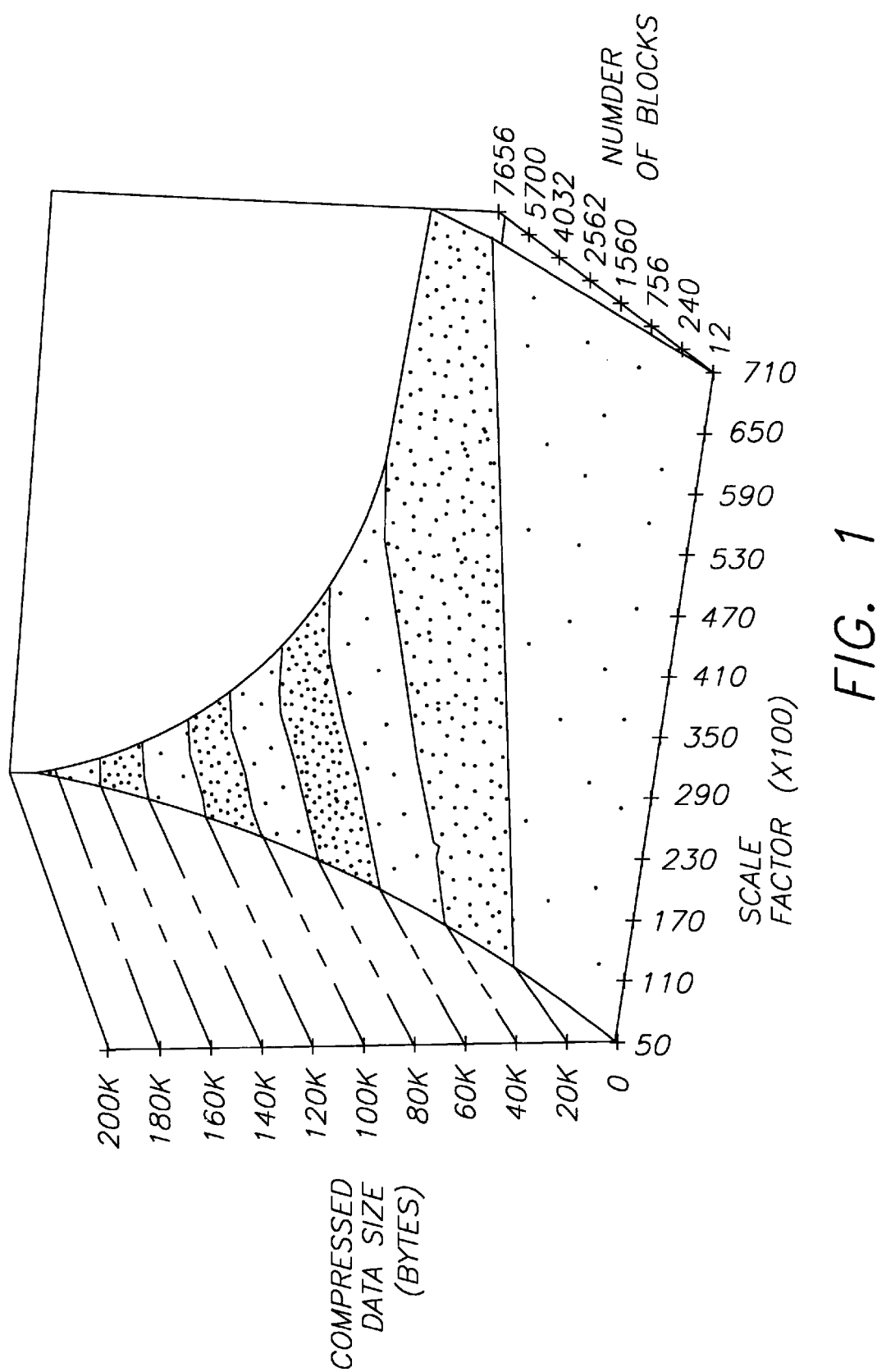
FIG. 1 is three-dimensional plot of image resolution ("Number of Blocks"), a particular compression factor ("Scale Factor") and resulting compressed image size ("Compressed Data Size") for a typical image compressed using JPEG compression as described above.
Figure 2:
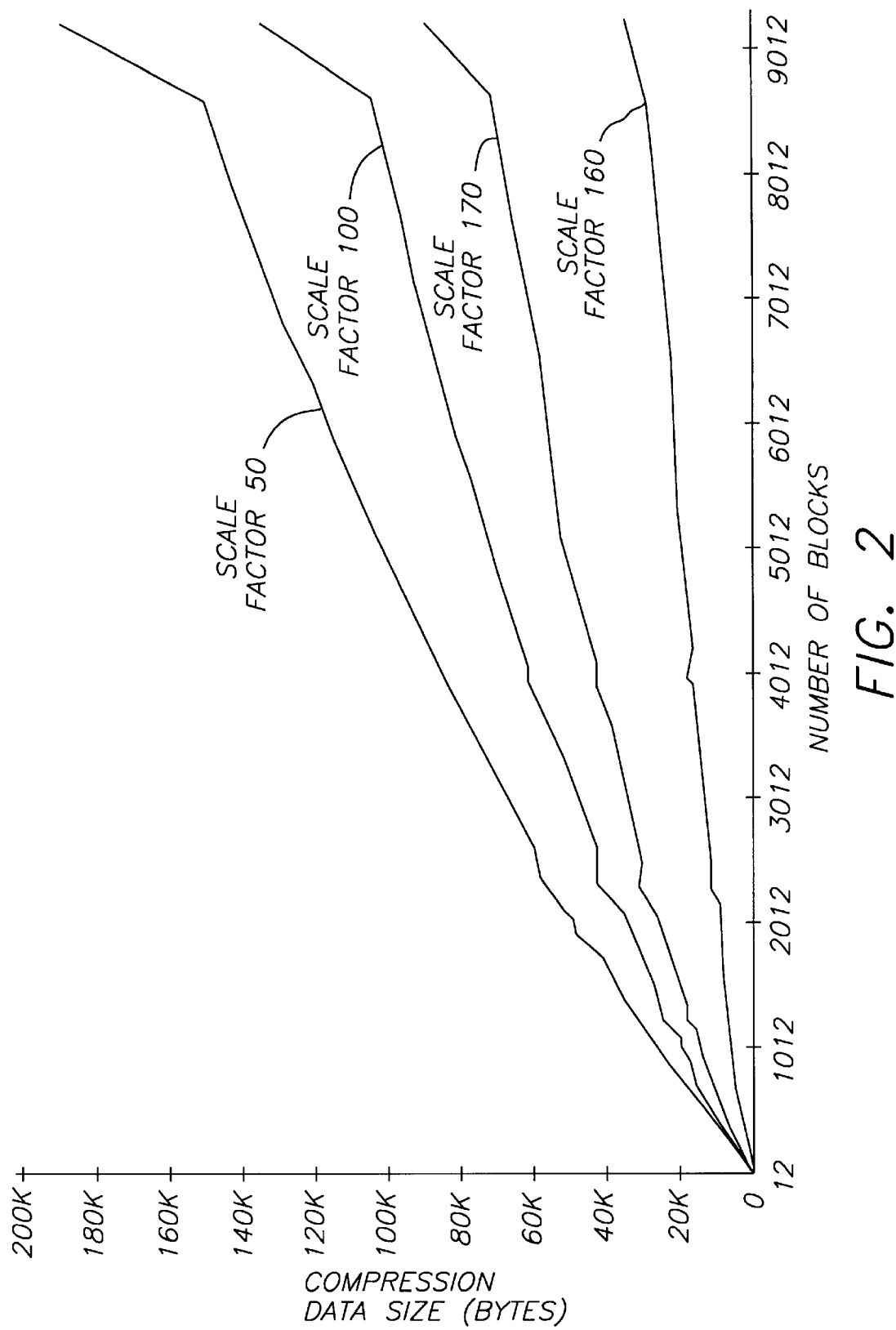
FIG. 2 are cross-sections along the plot of FIG. 1 representing compressed image size versus image resolution.

In FIG. 1, reference to "Number of Blocks" indicates the image resolution (that is, image pixels). In particular, the number of blocks refer to the number 16×16 pixel blocks needed to represent the image (times 3 because of the three color channels composing the image). In practice, the number of pixels can just as easily be used instead, with no noticeable effect on results. In the drawings, "Rf" refers to the full resolution image while "Rt" refers to a reduced resolution version of the image in the form of a thumbnail resolution (Rf used was 600×400 pixels, while Rt used was 96×64 pixels). "Scale Factor" refers to the scale factor used in the JPEG compression (and hence represents compression factor) and "file datasize" or the like refers to the compressed image size.

Referring to FIG. 1, it can be seen that for a given image, once one point on the plot has been defined any other point on the plot can also be defined. Several different images were plotted in the same manner as FIG. 1 and while at any given position on the plot actual values varied depending upon the image, the general shape of the curve was essentially similar. Given approximately similar curve shapes, a relative relationship between compressed image size, image resolution and compression factor can be determined from FIG. 1 which can be used for any image. While of course images do have their individual variations, the aim is to obtain a relatively good estimate the first time around, to keep the number of actual compressions performed on a full resolution image low (preferably, no more than one compression most of the time). In particular, from FIG. 1 the relationship between image resolution (in "Number of Blocks") and compressed image size ("Compressed Data Size") is approximately linear at any given compression factor ("Scale Factor"). The slope of the line can then be used as a predetermined relative relationship between image resolution and compressed image size at an selected initial compression factor. In practice, the initial compression factor is typically selected from experience as an average compression factor which tends to yield from the full sized images, compressed images of an acceptable size. Such approximate lines for multiple different images are illustrated in FIG. 3.

Figure 4:
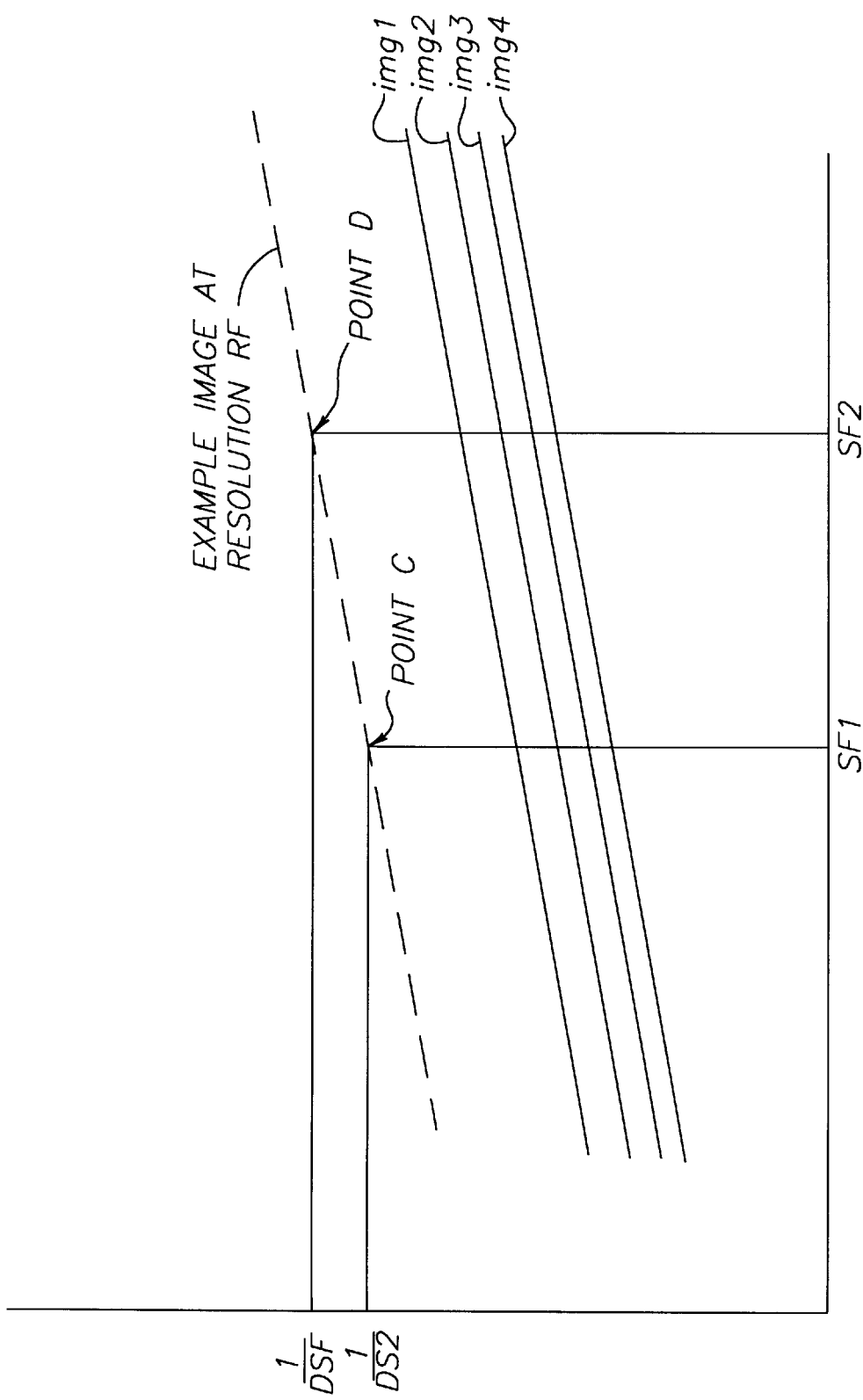
FIG. 4 are approximate plots of the inverse of compressed image size versus compression factor for the same images represented in FIG. 3 at a fixed resolution (full image resolution), using the same JPEG compression as in FIG. 3.

Similarly, from FIG. 1, the relationship between compression factor and the inverse of the compressed image size at a selected image resolution, is approximately linear (this relationship is referenced as a linear inverse relationship). The slope of this line can the be used as a predetermined relative relationship between compression factor and compressed image size at a selected resolution. In practice, the selected resolution for this latter relationship is the full image resolution (such as generated from an input source, such as a typical film scanner). Such approximate lines for multiple different images are illustrated in FIG. 4 (with the inverse of compressed image size being plotted). While of course, more accurate models might be used than the approximate linear relationship, the additional computational power required for such models is probably not worthwhile for the slightly improved accuracy that might result in the first iteration.

Figure 3:
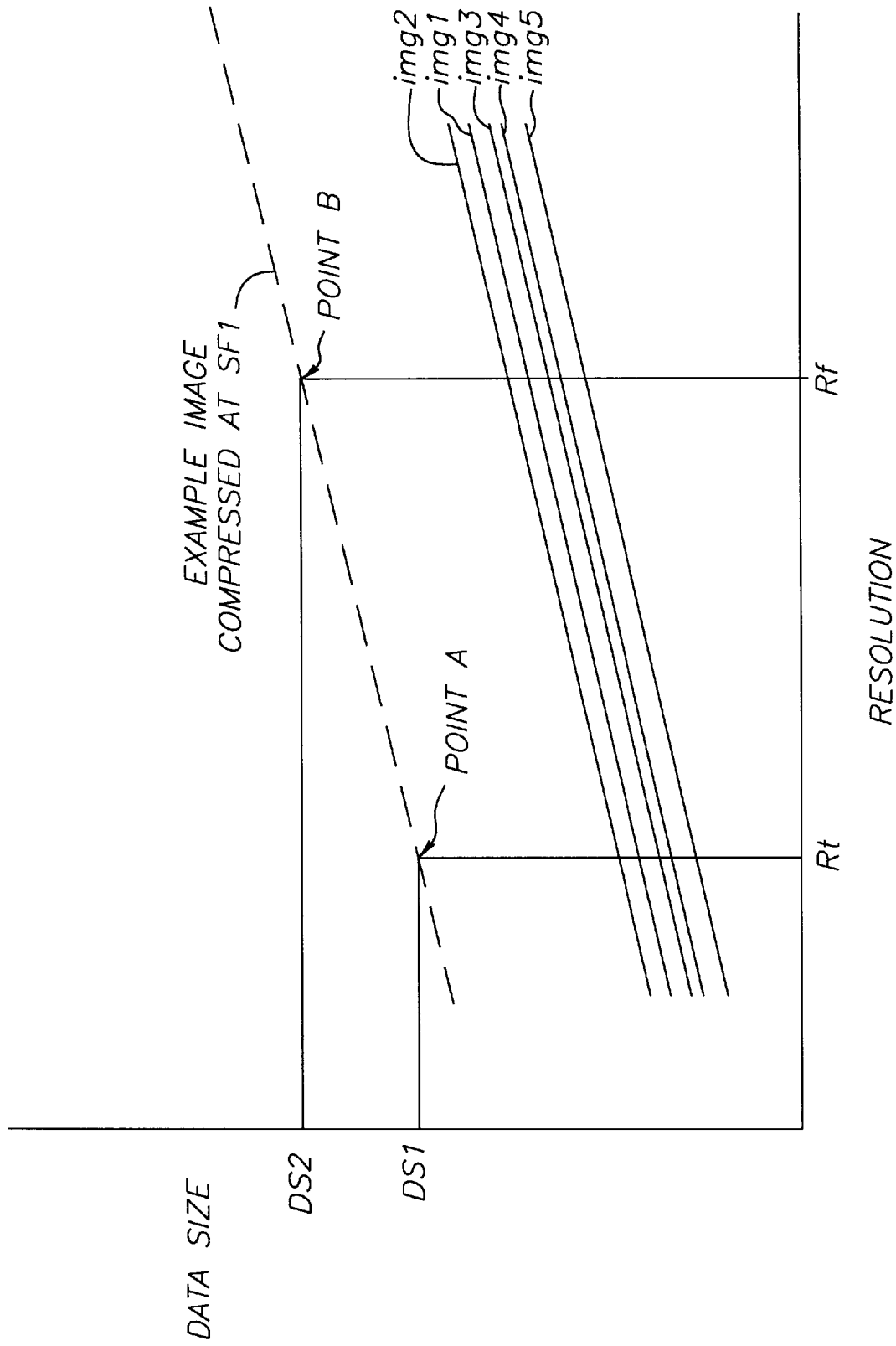
FIG. 3 are approximate plots of compressed image size versus image resolution for a number of different typical images, using JPEG compression as described above with a fixed compression factor.

FIGS. 3 and 4 were obtained by experimentation using a sample set of images where each image was available in multiple resolutions. Each of these images (at each resolution) were iteratively compressed using a quantization table scaled by a different factor. The resulting data was plotted in the two graphs. One (FIG. 3) shows the relationship between resulting compressed file size and the resolution of the image when the scale factor was held constant. While the particular lines varied for each image, there was an approximately consistent slope for all the images. For a given scale factor the slope (referenced as "m5$a$") was consistent among all the images. The second plot (FIG. 4) shows the relationship between compressed file size (or more specifically, its inverse) and a scale factor for a fixed resolution for a scene. As in FIG. 3, this relationship was not exactly the same for different images, or in this case even for the same images at different resolutions. However, the slopes (referenced as "m5$b$") of these relationships (lines) in FIG. 4 were the approximately the same. Each of these two linear relationships can be considered components (or sub-relationships) of an absolute relationship between all three variables (compressed image size, image resolution and compression factor) for a given image, or components of a relative relationship of the three variables for any image. The particular values of the slopes m5$a$ and m5$b$ used, can be determined by compressing a set of thumbnail resolution versions of images at a scale factor of 3.00 (average result 2892 bytes), next compressing the corresponding full resolution images at a scale factor of 3.00 (average result 37919 bytes), the resulting two points providing the slope of FIG. 3. For FIG. 4, the full sized images were used at a scale factor of 6.00 (average result 23310 bytes), and this data point and the previous point at scale factor of 3.00 provide the slope. These resulting slope values will remain substantially the same for most JPEG quantization tables, but may change if unusual tables are used. Slope values such as these, can be used for any images of a given class, however different values are best generated for different classes of images (examples of different image classes include: consumer color photographic images, computer graphic color images, medical images, black and white images, and the like).

It is apparent from FIGS. 3 and 4 that one way of estimating a compression factor for an image needed to obtain a predetermined compressed image size, is to compress a lower resolution version of the image (that is, having a resolution lower than that of the image, in particular "Rt" in FIG. 3) at an initial selected compression factor. This initial compression factor is selected as described above. Using JPEG compression as referenced above, a suitable initial compression factor was defined by the JPEG quantization table and an initial scale factor of 3.00. The predetermined sub-relationship between image resolution and compressed image size at a given compression factor (that is, the slope m5$a$ of the lines in FIG. 3), can be used together with the size of the compressed low resolution version and corresponding resolution of the low resolution version of the image ("Point A" in FIG. 3, having resolution "Rt" and compressed size "DS1"), to obtain an expected size ("DS2") of the compressed image of the full resolution image ("Rf") if compressed at the same initial compression factor. This obtained estimate is represented at "Point B" in FIG. 3. The expected size ("DS2") and corresponding compression factor (scale factor "SF1" in FIG. 4) are then used with the second pre-determined linear sub-relationship from FIG. 4 (specifically, the slope m5$b$) to estimate the compression factor ("SF2") for the image needed to obtain the aim compressed image size ("DSf"). The resulting point on FIG. 4 is "Point D". Using the slopes of FIGS. 3 and 4 in this manner is a matter of computationally very simple algebra.

Figure 5:
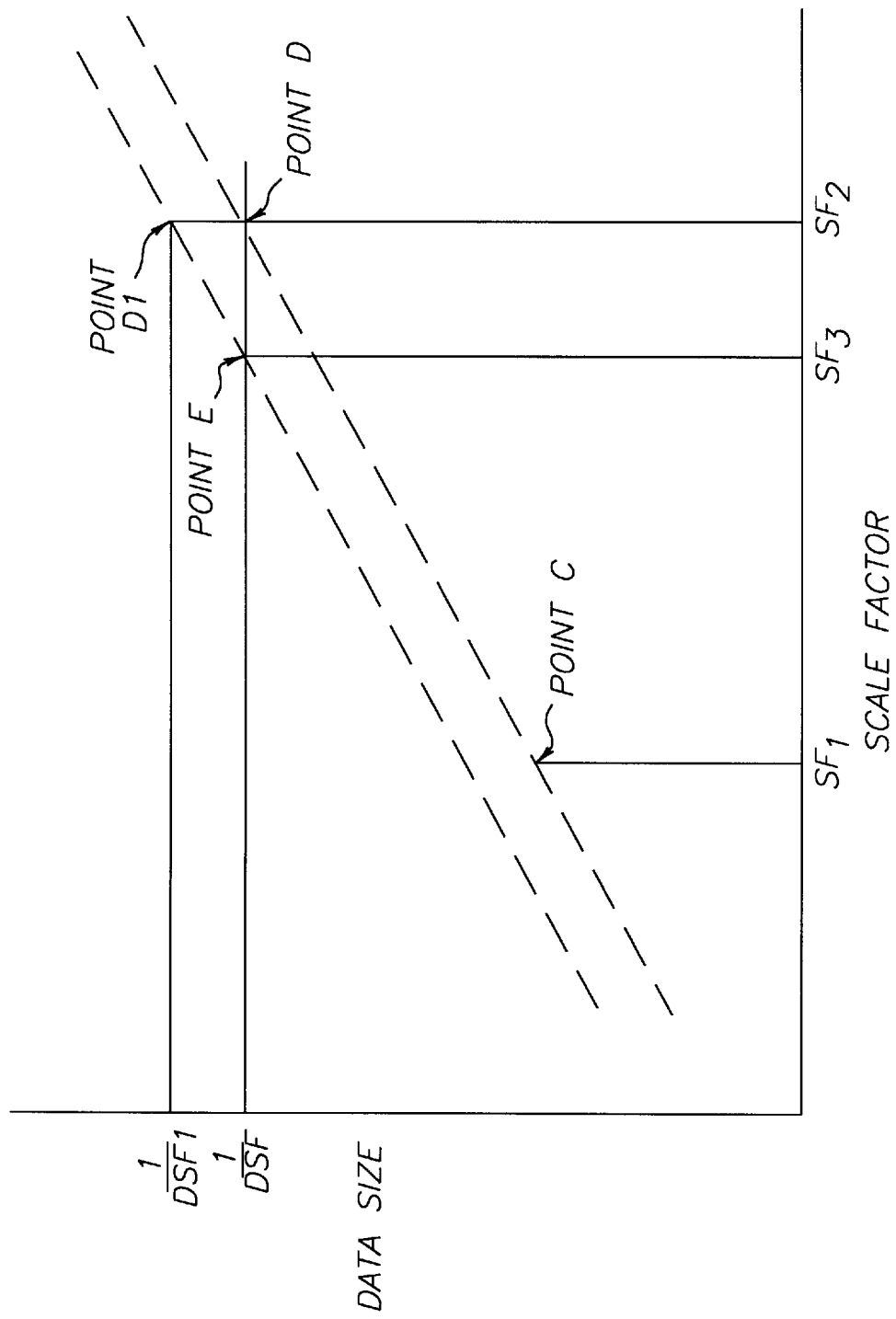
FIG. 5 is a plot for a given image similar to FIG. 4 to illustrate modifying an estimated compression factor.

FIG. 5 illustrates one way by which successive iterations can be performed, if necessary, to obtain an actual compressed image size which is within a predetermined tolerance of the aim compressed image size. In particular, if after compressing the image with the estimated compression factor SF2, it is found that the actual compressed image ("Point D1") has a size ("DSf1") which differs by more than a predetermined tolerance from the aim compressed image ("Point D") size (DSf), the actual compressed image size can be used with the predetermined relationship (slope m5$b$ of FIG. 5) to obtain a corrected estimated compression factor ("SF3") which is anticipated to provide an actual compressed image ("Point E") size closer to the aim compressed image size (DSf). This is referenced as Option A. It is possible to establish a new relationship between compressed image size and compression factor (that is, draw a line with a different slope) using, for example, the actual compressed image size and corresponding compression factor (Point D1) and another compressed image size and corresponding compression factor (such as Point C). This is referenced as Option B. When two (or more) actual compressed image sizes are available, these are preferably used (such as Point D1 and another actual point). However, in the first iteration when there is only one actual compressed image size available, the determination of which option to use is best based on how close the resolution of the reduced resolution version is to the resolution of the full resolution image. If the reduced resolution version is significantly smaller than the full resolution image, then option A usually takes less iterations. If the reduced resolution version is not much smaller than the full resolution image then option B will usually be faster. It has been found that where the full resolution image has about 40 times more pixels than the reduced resolution version, the best performance is obtained from using Option A.

Figure 6:
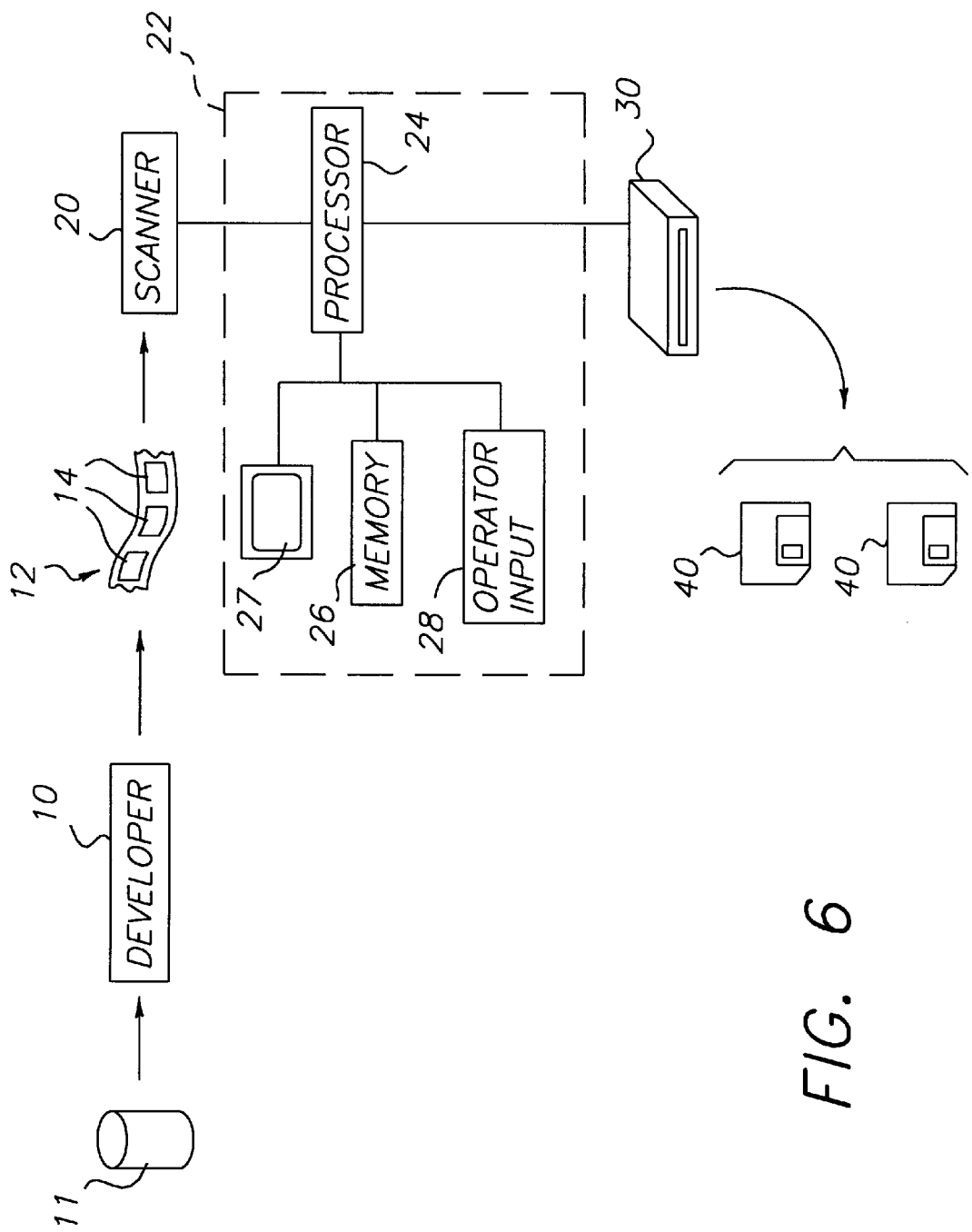
FIG. 6 is a photofinishing apparatus of the present invention.

Referring now to FIG. 6, a schematic of a photofinishing apparatus which can execute a method of the present invention is provided. The illustrated apparatus may be that used in a typical retail or wholesale photofinishing operation. There is included a developer 10 which can chemically process a roll of an exposed silver halide photographic film 12 (delivered to developer 10 inside canister 11) bearing latent optical images, to provide a set of developed optical images 14 in fixed form on the film. Typically a "set" of optical images will be all of the images in one roll of film 12. A scanner 20 is capable of scanning each of the images 14 of the set on developed film 12 to yield a corresponding digital image signal, in a known manner using a source of illumination which passes through each image 14 in turn (or is reflected from images which may be on a reflective base, such as paper prints) onto a sensor. Scanner 20 is sometimes referred to as a film digitizer. Such scanners take a variety of forms and the various common aspects of film digitizing, particularly line illumination and linear CCD-based digitizers, are described in greater detail in commonly assigned U.S. Pat. No. 5,012,346. However, other scanners, such as area array scanners, are also well known.

An image signal processing apparatus 22 includes a digital processor 24 connected to receive the digital image signals (a digital image set) corresponding to the developed optical film images and compress them using JPEG or some other lossy variable compression function algorithm. Processor 24 is preferably a general purpose digital computer processor suitably programmed to execute the steps of the method of the present invention. However, it will be understood that the functions of suitable programmed processor 24 could be provided in part or completely by suitable hardware circuit elements. Programming of processor 24 can be accomplished, for example, from a program product, comprising: a computer readable storage medium having a computer program stored thereon which when read and executed by processor 24, performs the steps required by the present invention. Such a computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium which might be employed to store a computer program. Programming from the computer readable storage medium could be accomplished at the location of processor 24 (for example, with a suitable magnetic or optical disk drive) or remote from it (for example, the storage medium could be read by a disk drive at a remote location and the programming code transmitted to processor 24 through a suitable network, such as the Internet or a telephone network).

Apparatus 22 further includes a memory 26 for holding data required by processor 24 as well as a media writer 30. An optional monitor 27 and optional operator input 28 (such as a keyboard or mouse) may be provided to allow a system operator to view progress of scanning rolls of film and input various commands (such as stop, start, redo a particular film 12, and the like). Writer 30 can preferably write onto one or more removable blank writable media 40 simultaneously, which may be fed automatically into and out of writer 30 under control of processor 24. The media on which writer 30 writes, is a fixed storage capacity media most typically in the form of a magnetic diskette. However, writer 30 can be such as to be capable of recording on other media, particularly portable storage media, such as any optical or magnetic media, or solid state media, of fixed storage capacity. The components of the apparatus of FIG. 1 are typically found at the same location (that is, in the same building). However, one or more of the components can be positioned remotely from the other(s) (that is, in a different building which may be one or more miles away from the location housing other of the components). For example, developer 10 may be remote from the location of apparatus 22 and connected thereto over a suitable wired or wireless communication channel, such as the internet, another public network connection, or a dedicated communication channel (including a dedicated computer network).

A reduced resolution version of each scanned image can be obtained, for example, by a higher speed pre-scan before the scanning of the optical images at full resolution, or could be obtained in processor 24 by decimation of the full resolution image.

In operation, a user brings or has sent to the location of developer 10, one or more exposed photographic canisters 11 each containing an undeveloped film carrying one or more latent images. Developer 10 then processes these to yield a set (that is, more than one) of fixed images 14 on the film 12. The film 12 bearing the fixed image collection is then transferred to scanner 20 where a corresponding digital image set is generated and transmitted to processor 24. In other cases, a user may simply bring in an already developed film strip 12 for scanning. Alternatively, one or more images may be provided by at least some customers, already in the form of digital image signals, such as from a portable storage medium or through a network (such as the Internet). Processor 24 then compresses the image collection (it will be understood at this point that the signal representing the image collection is being referenced) in accordance with the steps of a method of the present invention, and causes the compressed image collection to be written by writer 30 onto a single removable storage medium 40 or causes image sub-collections (typically all of which are compressed) onto one or more removable storage media 40.

Figure 7:
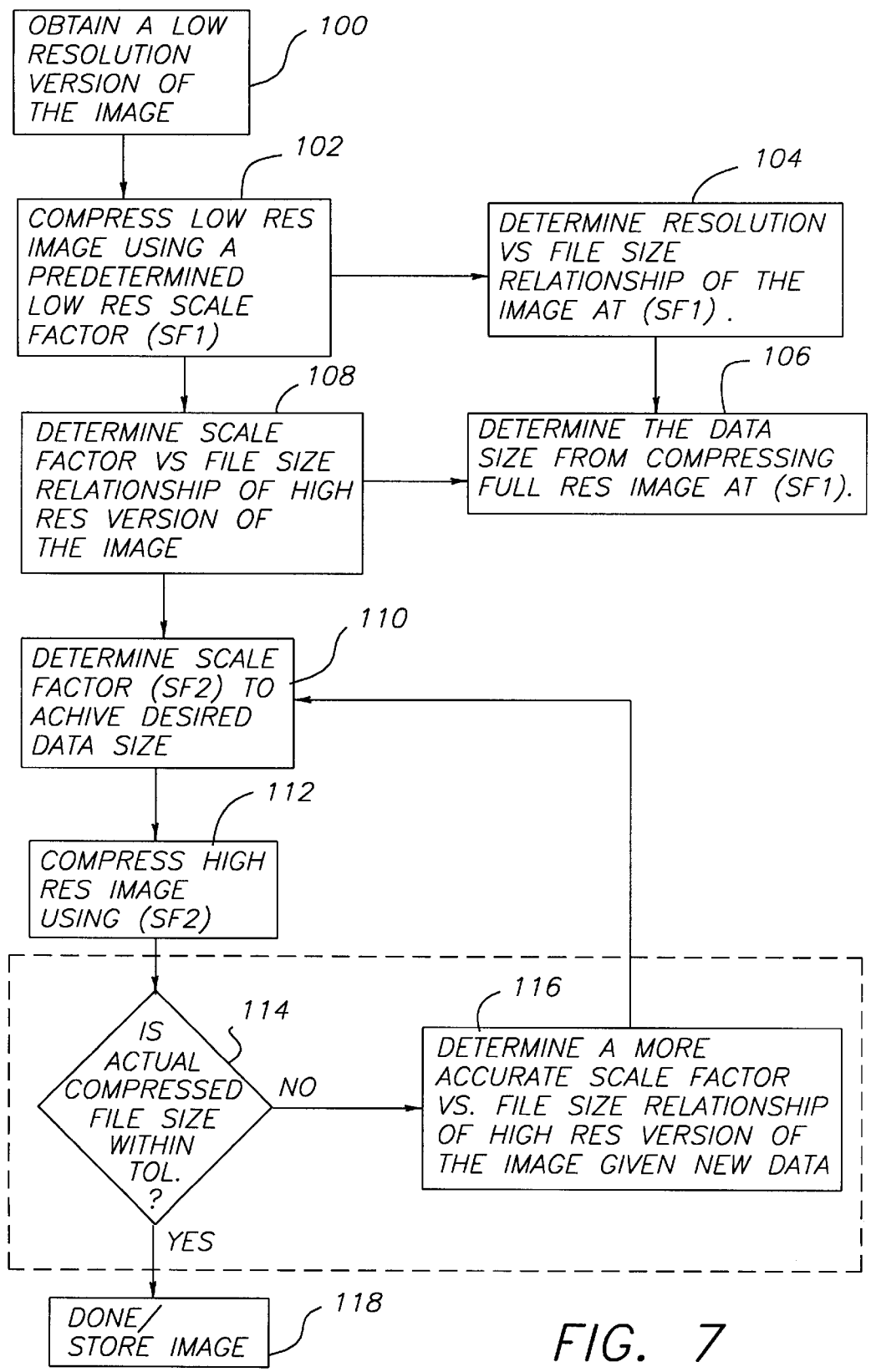
FIG. 7 is a flowchart illustrating a method of the present invention as used for a single image.

Turning now to FIG. 7, the sequence of steps by which a method of the present invention is executed by processor 24, for a single image, will now be described. First, a reduced resolution version of the image, such as a "thumbnail" size, is obtained (100). This lower resolution of the image may be obtained from a pre-scan, or alternatively the full resolution image can be decimated down to a reduced resolution version using known techniques. This reduced resolution version of the image is compressed (102) using an initial scale factor (SF1), selected as previously described. This reduced resolution version of the image is not a specific resolution, but may for example have resolution Rt. The initial scale factor has been found not to be critical as long as it is reasonable. Something that will provide compression ratios between about 20 to 1 and 5 to 1 is fine. This compression yields a "data point" (Rt, DS1) which represents this image, at resolution Rt, when compressed with scale factor SF1, will result in an image of data size DS1. This is labeled on FIG. 3 as point "A". Next, from FIG. 3 the slope m5$a$ of the line is obtained (104). Using this slope (relationship) the data size that will result from compressing not the thumbnail size, but rather the full res version (Rf) of the image at the same scale factor (SF1) is determined (106). This is labeled as point "B" (Rf, DS2) on FIG. 3. The same data represented as point B on FIG. 3 can be located on FIG. 4 as point C (SF1, 1/DS2). The relationship of the lines in FIG. 4 (slope) is now used together with point C to estimate (108) the dashed line in FIG. 4 which represents scale factor versus compressed image size for the image to be compressed. Given the dashed line in FIG. 4 established in the previous step, a scale factor (SF2) is estimated (110) to obtain the aim compressed image size (DSf). The conclusion is that SF2 is the scale factor to be used when compressing the full size image that will result in the aim compressed image size of DSf. The full resolution image is then compressed with the scale factor of SF2.

The actual data size resulting from the above method is not guaranteed to be exactly DSf. The main cause of this is that there exists data (information) in the full-res image that is not in the low-res image. Regardless of the way the low-res image was obtained it simply cannot 100% represent the information of full-res image. What is often more important is not that the data size be exactly DSf, but that it not be greater than DSf. For example—a data storage space that is DSf bytes large has been allocated for this image, therefore the image must fit in it, but could be smaller. Of course too much "extra space" would sacrifice more image quality than necessary. To ensure that the actual compressed image size will be within a predetermined tolerance of the aim compressed image size, including being no greater than DSf, an optional iteration can be performed one or more times. This is accomplished in the manner described in connection with FIG. 5 above. Referring again to FIG. 7, the optional iteration method is shown in the dashed line block. The actual compressed image size is compared with the aim compressed image size (114). If DSf1 is not within the predetermined tolerance of what is "close enough" to DSf, then we prepare to estimate a corrected compression factor using the new data point D1 of FIG. 5. Note that point D is no longer used because it was a derived or estimated point, whereas point D1 was obtained through actual compression of the full image. From point D1 and the original predetermined relationship (that is, consistent slope m5b ), a corrected estimated compression factor SF3 can be determined (110). The algebra involved can be envisioned as drawing the dotted line of FIG. 5 to obtain (116) a more accurate scale factor versus compressed image size specific relationship). The image can be compressed using this corrected estimated compression factor. These steps can be repeated using the corrected compression factor as the initial compression factor, as required until the actual compressed image size is within the predetermined tolerance of the aim compressed image size.

Figure 8:
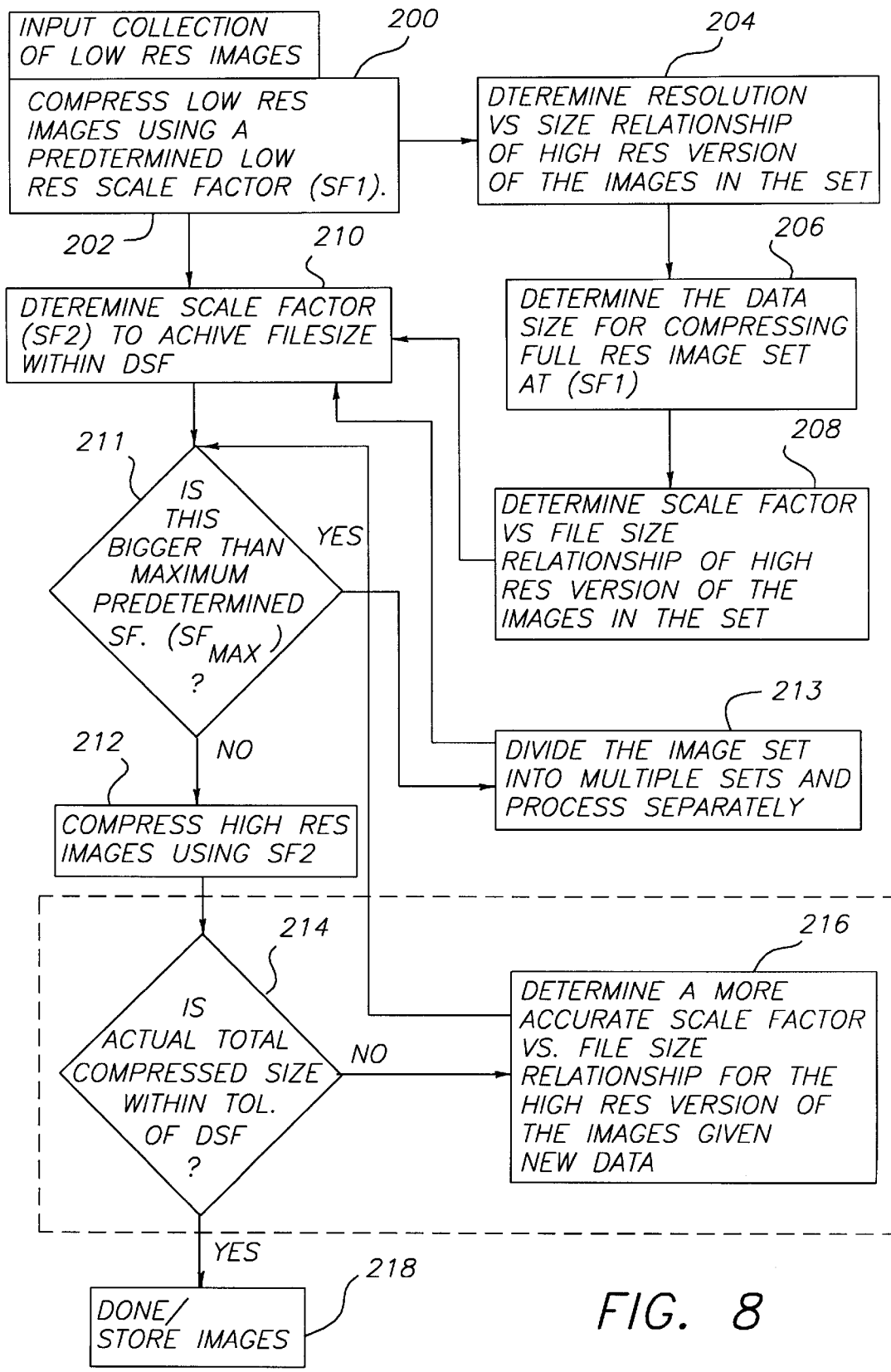
FIG. 8 is similar to FIG. 7 but illustrating a particular method as used with a set of images.

Referring now to FIG. 8 a method of the present invention as used with a set of a plurality of images, is illustrated. This method is essentially the same as the method of FIG. 7 and the same steps have been given the same numbers except that a step in FIG. 7 has a number 1xy, while the same step in FIG. 8 is numbered 2xy. In the method of FIG. 8, the set of images is treated essentially like one image. and each image is compressed with the same scale factor.

The same set of "plots" and relationships hold true from the single frame method. In other words, if a reduced resolution image would have been compressed in FIG. 7 at the predetermined SF1, then instead you compress each of the reduced resolution versions in the set at the compression factor SF1. Instead of a single resulting data size, there would obviously be a data size for each image. These should summed to obtain a single total size of the compressed resolution versions. The relationships (or lines) which are established are still a single line, not one per image. The line represents data for all the images in the set. The algorithms for determining and updating the relationships (as in Option A and B above) are still true when working with multiple images as a set.

Optionally the estimated compression factor can be compared (211) with a predetermined maximum scale factor and, if beyond that scale factor (specifically, if that predetermined maximum is exceeded), the images are divided (213) into one or more sub-sets each of which is processed as a separate set. A maximum scale factor is set to ensure that a minimal acceptable image quality will be obtained. A single set of images should preferably fit on a single floppy disk, but it is permissible for the set to be divided and put on multiple disks if required to maintain some desired degree of image quality (corresponding to Sfmax).

It should be noted that when the images are to be stored on a limited sized portable storage medium, such as a magnetic floppy disk having only about 1.44 MB in storage space, it may also be desirable to provide the reduced resolution versions of the images on the disk also. In this case, in determining the available space and hence aim compressed image size for a set of images corresponding to one customer film roll 12, the space occupied by the reduced resolution versions of the image (usually compressed by the initial scale factor) must first be subtracted from the disk capacity to obtain the available aim compressed image set size.

The invention has been described in detail with particular reference to certain preferred embodiments thereof, but it will be understood that variations and modifications can be effected within the spirit and scope of the invention.

| PARTS LIST | |
|---|---|
| 10 | Developer |
| 11 | Canister |
| 12 | Film |
| 14 | Images |
| 20 | Scanner |
| 22 | Apparatus |
| 24 | Digital Processor |
| 26 | Memory |
| 27 | Monitor |
| 28 | Operator input |
| 30 | Media writer |
| 40 | Media |
| (100–116) | Steps |
| (211–213) | Steps |

What is claimed is:

1. An image compression method comprising:
   a) obtaining a reduced resolution version of an image;
   b) compressing the reduced resolution version of the image with a selected compression factor;
   c) using a size of the compressed reduced resolution version of the image and the corresponding compression factor, to estimate a compression factor for the image needed to obtain an aim compressed image size, or to estimate a size of the compressed image resulting from a predetermined compression factor; and
   d) compressing the image using the estimated or predetermined compression factor;
   wherein:
   the size of the compressed reduced resolution version and corresponding compression factor are used to estimate a compression factor for the image to obtain an aim compressed image size;
   the compression factor is estimated from the size and the corresponding compression factor of the compressed reduced resolution version, and a predetermined relationship between compressed image size, image resolution and compression factor; and
   the image is compressed using the estimated compression factor;

the method additionally comprising:

(e) comparing the actual size of the compressed image with the aim compressed image size; and (f) when the actual compressed image size is not within a predetermined tolerance of the aim compressed image size, estimating a corrected compression factor using either:

(i) the actual compressed image size and the predetermined relationship; or (ii) a new relationship between compressed image size and compression factor determined from the actual compressed image size and corresponding compression factor, and another compressed image size and corresponding compression factor.

2. The method according to claim 1 wherein the another estimated compressed image size and corresponding compression factor, are obtained using the size and corresponding compression factor of the compressed reduced resolution version.

3. The method according to claim 1 additionally comprising:

(g) compressing the image using the corrected compression factor; and (h) repeating steps (e) to (g), as necessary, using the corrected compression factor as the estimated correction factor, until the actual compressed image size is within a predetermined tolerance of the aim compressed image size.

4. A method of compressing a set of a plurality of images, comprising:

a) obtaining a reduced resolution version of each image of the set;

b) compressing the reduced resolution versions of the images at a selected compression factor;

c) using a total size of the compressed reduced resolution versions and the corresponding compression factor, to estimate a compression factor for the set needed to obtain a predetermined compressed set size, or to estimate the size of the compressed set resulting from a predetermined compression factor; and d) compressing the set using the estimated or predetermined compression factor, wherein:

the compression factor is estimated from the total size and corresponding compression factor of the compressed reduced resolution versions, and a predetermined relationship between compressed image size, image resolution and compression factor;

and wherein the set is compressed using the estimated compression factor;

the method additionally comprising:

(e) comparing the actual size of the compressed set with the aim compressed image size; and (f) when the actual compressed set size is not within a predetermined tolerance of the predetermined compressed image size, estimating a corrected compression factor using either:

(i) the actual compressed set size and the predetermined relationship; or (ii) a new relationship between compressed set size and compression factor determined from the actual compressed set size and corresponding compression factor, and another compressed set size and corresponding compression factor.

5. A computer program product, comprising: a computer readable storage medium having a computer program stored thereon which when read and executed by a programmable computer, performs the steps of:

a) obtaining a reduced resolution version of an image;

b) compressing the reduced resolution version of the image with a selected compression factor;

c) using a size of the compressed reduced resolution version and the corresponding compression factor, to estimate a compression factor for the image needed to obtain an aim compressed image size, or to estimate the size of the compressed image resulting from a predetermined compression factor; and d) compressing the image using the estimated or predetermined compression factor;

wherein the computer program, when read and executed by a programmable computer:

estimates the compression factor from the size and corresponding compression factor of the compressed reduced resolution version and a predetermined relationship between compressed image size, image resolution and compression factor;

and compresses the image using the estimated compression factor;

and the computer program additionally:

(e) compares the actual size of the compressed image with the aim compressed image size; and (f) when the actual compressed image size is not within a predetermined tolerance of the aim compressed image size, estimates a corrected compression factor using either:

(i) the actual compressed image size and the predetermined relationship; or (ii) a new relationship between compressed image size and compression factor determined from the actual compressed image size and corresponding compression factor, and another compressed image size and corresponding compression factor.

* * * * *